United States Patent [19]

Serkh

[11] Patent Number: 5,647,813

[45] Date of Patent: Jul. 15, 1997

[54] TENSIONER WITH DAMPING MECHANISM AND BELT DRIVE SYSTEM

[75] Inventor: Alexander Serkh, Windsor, Canada

[73] Assignee: The Gates Corporation, Denver, Colo.

[21] Appl. No.: 574,070

[22] Filed: Dec. 18, 1995

[51] Int. Cl.⁶ ............................................. F16H 7/14
[52] U.S. Cl. ............................. 474/135; 474/101
[58] Field of Search ................. 474/94, 101, 109, 474/133, 135, 273

[56] References Cited

U.S. PATENT DOCUMENTS

| | | | |
|---|---|---|---|
| 4,473,362 | 9/1984 | Thomey et al. | 474/135 |
| 4,551,120 | 11/1985 | Thomey | 474/135 |
| 4,557,707 | 12/1985 | Tomey | 474/101 |
| 4,689,037 | 8/1987 | Bytzek | 474/135 |
| 4,696,663 | 9/1987 | Thomey et al. | 474/133 |
| 5,045,031 | 9/1991 | Thomey | 474/138 |
| 5,234,385 | 8/1993 | Kawashinma et al. | 474/135 |
| 5,236,396 | 8/1993 | Golovatai-Schmidt et al. | 474/101 |

OTHER PUBLICATIONS

SAE Paper No. 790699, Jun. 11–15, 1979 Serpentine –Extended Life Accessory Drive, Cassidy et al.

*Primary Examiner*—David J. Bagnell
*Assistant Examiner*—Tony Boyd
*Attorney, Agent, or Firm*—H. W. Oberg; C. H. Castleman, Jr.

[57] ABSTRACT

A belt tensioner of the Zed type with a pivot-arm attached to an off-set cylindrical member supported by sleeve-type bushings with axially spaced-apart bearing surfaces disposed over a pivot where the bearing surfaces have an axial length that is sized for an average pressure contact. The tensioner may include a spring activated damping mechanism with a brake shoe having oppositely facing inside ramp surfaces which operate in such a manner to provide a normal force that is greater than a spring force applied to the brake shoe.

18 Claims, 4 Drawing Sheets

TENSIONER WITH DAMPING MECHANISM AND BELT DRIVE SYSTEM

BACKGROUND OF THE INVENTION

The invention relates to a tensioner with a damping mechanism and a belt drive system that includes such a tensioner. More particularly, the invention relates to a tensioner with a torsional spring that biases the position of a pivot-arm to which a belt engaging pulley is rotatably mounted. The tensioner of the invention with its damping mechanism is particularly useful in controlling tension of a V-ribbed belt drive system such as a front end accessory drive for automotive engine applications.

A mechanical tensioner is used to automatically control the tension of a V-ribbed belt of a front end accessory drive for automotive engine applications. Such a tensioner has a pivot-arm that rotates about a pivot secured to a base and uses a sleeve-bushing on the pivot to provide a bearing surface for the rotating pivot-arm. Many of such bushings are made of plastic and are subject to wear over the expected life of the tensioner. A torsional spring is often used with one end connected to the pivot-arm and the other end interconnected through the base to bias the position of the pivot-arm and position an attached pulley against a belt. The spring is also used to generate a spring force operative with a damping means that generates a normal force component to a friction sliding surface to inhibit or dampen oscillatory movements of the pivot-arm.

In some tensioner designs, the bearing for the pulley is in the same radial plane as the bushing so that bushing loads are minimized and bushing wear does not appreciably lead to "free play" or "cocking" of the pivot-arm with attendant misalignment of the pulley over the expected operative life of the tensioner. Examples of belt tensioners with the pulley bearing aligned in a common radial plane with the pivot-arm pivot bushing are disclosed in U.S. Pat. Nos. 4,696,663 and 5,045,031.

Another belt tensioner design centralizes the location of the pivot-arm between oppositely wound torsional springs and locates the pulley bearing midway between nylon insert bushings. The symmetrical design of the springs and location of the bushings result in substantial equal wear of each bushing. An example of such a tensioner is disclosed at Page 8 of SAE Technical Paper Series Number 790699. Problems of such tensioners include: their bulk because of the two spring design making them unsuitable for fitting within the available space limitations; their cost because of the several number of parts associated with the two spring design; and their lack of a sophisticated damping mechanism.

A tensioner design that solves the bulk, cost, and damping problems of the aforementioned SAE tensioner is disclosed in U.S. Pat. No. 4,473,362. The '362 tensioner has a pivot-arm attached to an off-set cylindrical member that supports the pivot-arm and rotates about a pivot secured to a base. Only one torsional spring is used with one end connected to the pivot-arm and the other end connected to the base. A single sleeve-type bushing on the pivot has a bearing surface that supports the cylindrical member. The radial plane of a pulley bearing is off-set in relation to the sleeve-type bushing which introduces a moment or couple as a load which must be carried by the bushing. Such tensioners are sometimes referred as "Zed" type tensioners because of the off-set of the pulley relative to its support or base structure. Unequal pressure loads introduced into bearing surfaces of the bushing can result in excessive bushing wear and attendant pulley misalignment.

The belt of a drive system utilizing such Zed type tensioner engages the pulley and generates a belt force at the pulley which is transmitted to the cylindrical member (hereinafter hub load). As explained in the '362 patent, the unequal loads to the bushing are reduced by a damping means that generates a normal force component acting in generally the same direction as the belt force component transmitted to the cylindrical member. Although the orientation of the belt force with the force component certainly alleviates some of the bushing load and attendant wear problems, it is lacking in some belt drive situations because the normal force component of the damping means is insufficient to balance against a moment generated by the belt force being off-set from the cylindrical member carrying the hub load, and the single bushing has a tendency to "bevel" or "crown" as bearing pressure loads change as the pivot-arm oscillates between clockwise and counter clockwise directions. In one direction of pivot-arm rotation, the friction force generated by the damping mechanism is additive to the loads to the bushing while in the counter direction of pivot-arm movement, the friction loads subtract. Eventually, "beveling" or "crowning" of the bushing due to unequal wear permits the cylindrical member and attached pivot-arm to "rock" causing misalignment of the pulley relative to the belt of a belt drive system. As manufactured, such tensioners may have pulleys aligned to plus or minus 0.5° but after extended use, the beveling of the bushing causes pulley misalignment as high as plus or minus 1.5°.

SUMMARY OF THE INVENTION

In accordance with the invention, a tensioner is provided that is particularly useful in V-ribbed front end accessory belt drive systems used in automotive applications where pulley alignment over the expected life of the tensioner is important. The belt tensioner of the invention is of the "Zed" type with a pivot-arm attached to an off-set cylindrical member that supports the pivot-arm and rotates about a pivot secured to a base. A sleeve-type bushing on the pivot has a bearing surface that supports the cylindrical member. A pulley is attached to the pivot-arm for engaging a belt of a belt drive system and receiving a belt load that generates a belt force component that is transmitted to the cylindrical member (hub load). The hub load and normal force component generated by the damping mechanism are carried by at least one or two bushings that have two axially spaced-apart bearing surfaces. The bushings have an axial length that size the bearing surfaces for an average pressure contact such that each bearing surface radially wears at substantially the same rate. The bearing surfaces wearing in at substantially the same radial rate assures pulley alignment over the expected life of the tensioner.

In some belt drive systems, the normal force component generated by the damping mechanism is insufficient to balance the hub load to provide the necessary average pressure contact at the bearing surfaces so that they wear at substantially the same radial rate. In such circumstances, and in accordance with another aspect of the invention, a damping mechanism is provided where the normal force generated by the damping means is greater than the spring force activating the damping mechanism. The damping means has a brake shoe with an outer arcuate surface that engages the inside of a second cylindrical member to provide friction surface sliding therewith. The brake shoe has two oppositely facing inside ramp surfaces where one of the ramp surfaces slidably engages a complementary ramp surface of the base and the other ramp surface slidably engages an extension of the spring end which applies the spring force to the brake shoe. The angle between the two ramp surfaces and direction of forces are such that a normal force component transferred to the brake shoe is greater than the applied spring force.

One advantage of the invention is the maintenance of pulley alignment within a small tolerance over the expected life of the tensioner.

Another advantage of the invention is a damping mechanism which generates a normal force greater than the spring force which can be used for secondary advantages such as increased damping.

These and other advantages of the invention will be apparent after reviewing the drawings and description thereof wherein.

DESCRIPTION OF PREFERRED EMBODIMENTS

Figure 1:
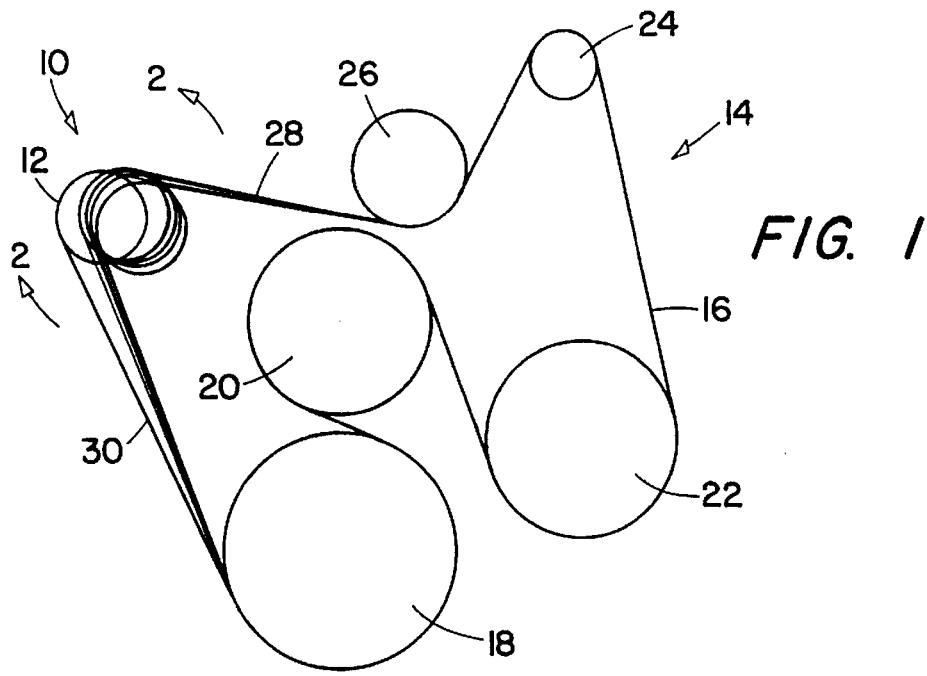
FIG. 1 is a front view schematic of a front end accessory drive system that includes a belt tensioner of the invention.
Figure 2:
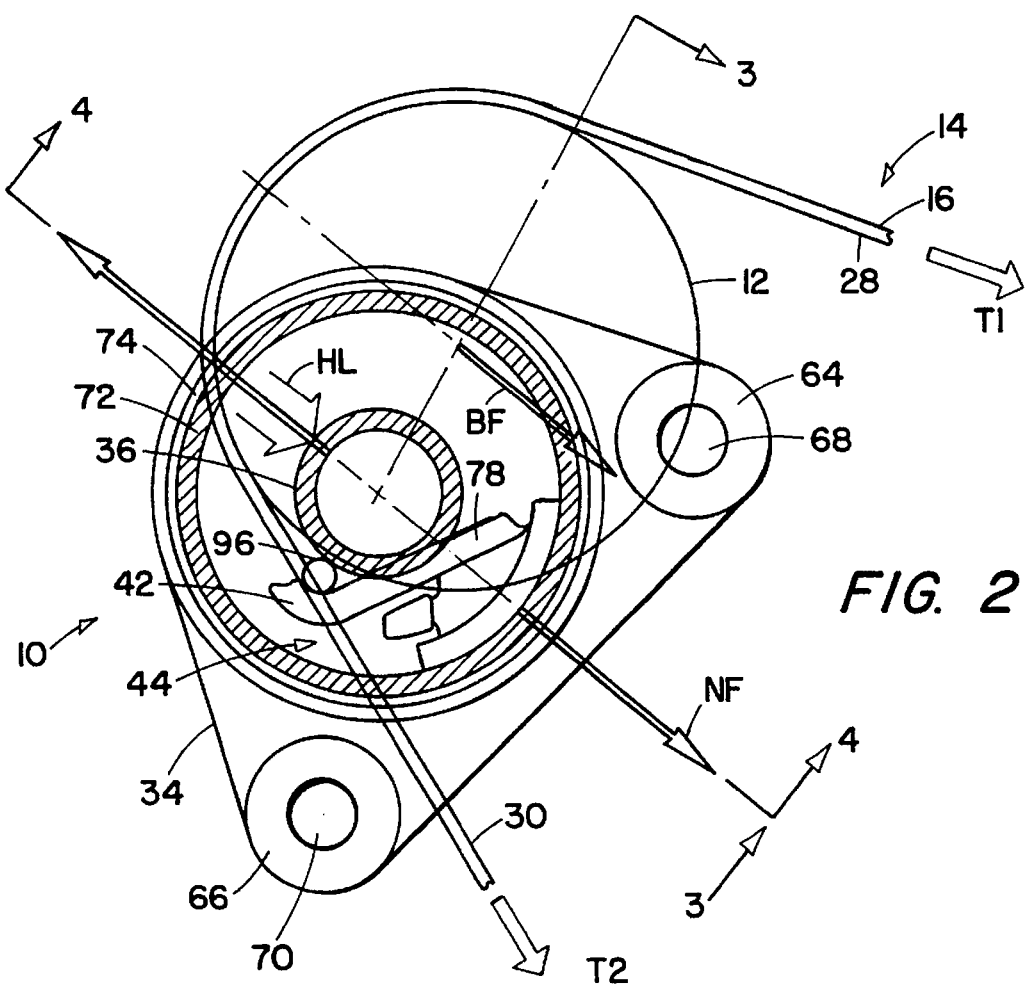
FIG. 2 is an enlarged partial schematic view taken generally at line 2—2 of FIG. 1 illustrating various component forces associated with the tensioner.

Referring to FIGS. 1 and 2, a tensioner 10 with a pulley 12 is illustrated as a component part of a belt drive system 14 that includes a belt 16 and several pulleys. By way of example, the belt 16 is entrained around a crank pulley 18, a fan/water pump pulley 20, a power steering pulley 22, an alternator pulley 24, an idler pulley 26, and the tensioner pulley 12. The tensioner pulley 12 engages the belt 16 and is shown in several positions to schematically show how the pulley moves to adjust belt tension. The tensioner pulley 12 engages the belt 16 and receives a belt load in the form of belt tension T1, T2, of adjacent belt spans 28, 30. The belt tension T1, T2 (or load) combine to generate a belt force component BF along a bisector or an angle formed between the belt spans 28, 30. The belt force component being axially off-set from a pivot 32 of the tensioner, generates a complicated hub load including forces and moments that are symbolically (i.e. not specifically) represented by the arrow HL.

Figure 3:
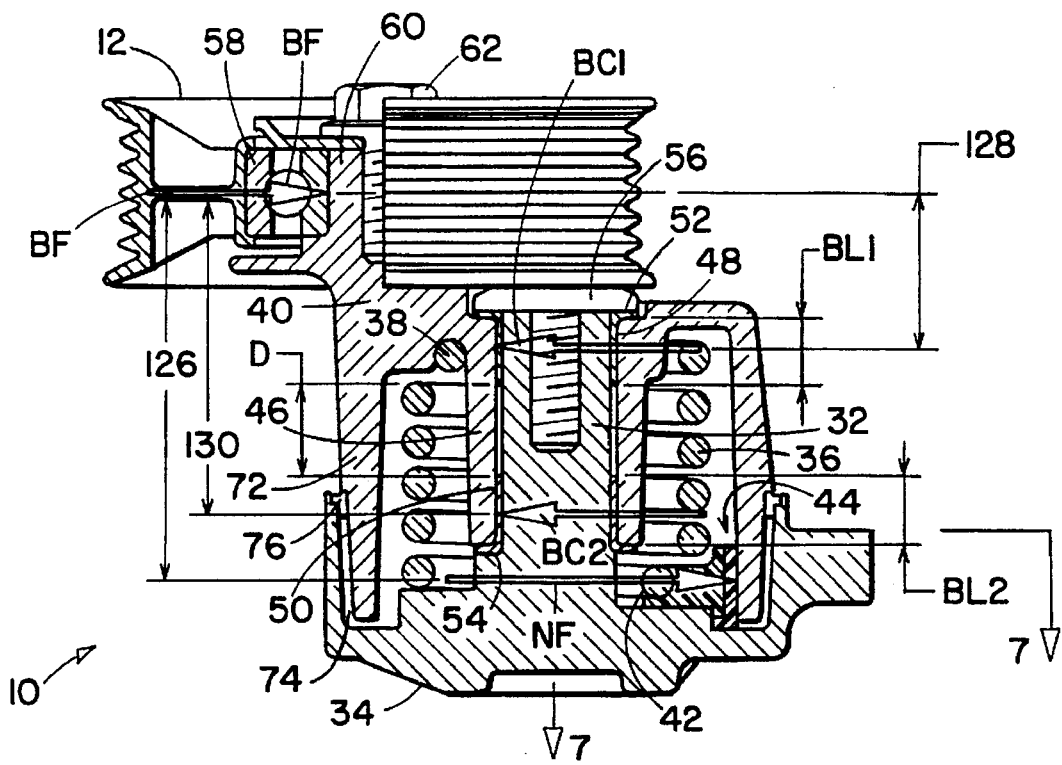
FIG. 3 is a cross-sectional view taken along the line 3—3 of FIG. 2 except for the pulley which is shown in a quarter cross-section.
Figure 4:
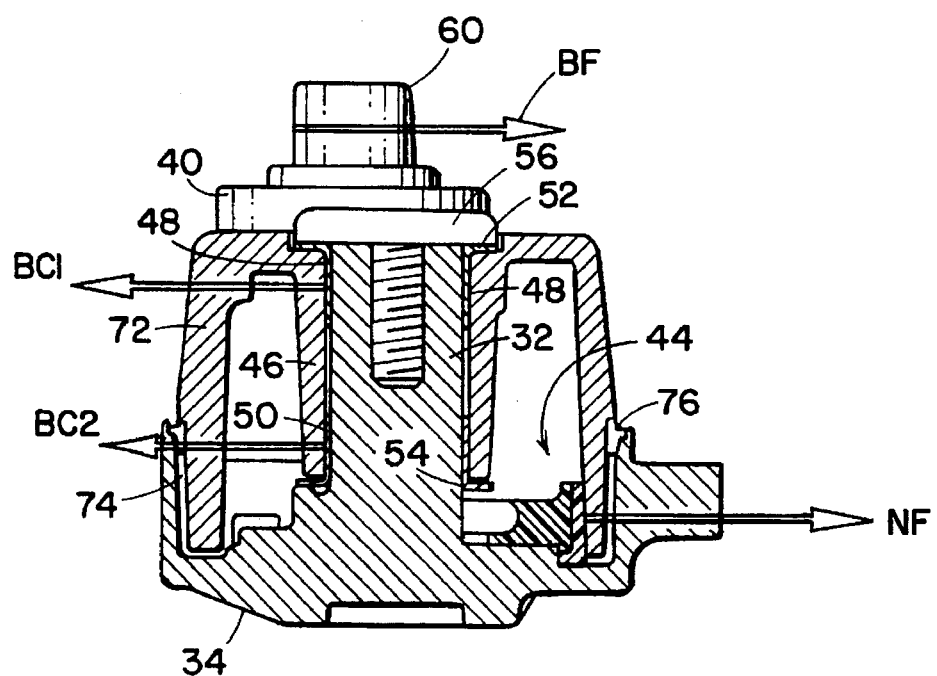
FIG. 4 is a schematic view taken along the line 4—4 of FIG. 4 with the pulley removed to illustrate force components associated with the invention.

Referring to FIGS. 2–4, the tensioner 10 is of the mechanical type and includes a base 34, a torsional spring 36, with one end 38 connected to a pivot-arm 40 and an other spring end 42 interconnected through the base generating a spring force operating with a damping means 44. The pivot-arm 40 is attached to an off-set cylindrical member 46 that supports the pivot-arm 40 and rotates about the pivot 32. Sleeve-bushings 48, 50 are preferably of the polymeric type and positioned on the pivot to support the cylindrical member with its attached pivot arm. The bushings, may included flanges 52, 54 as a thrust bearing for the cylindrical member and a flanged fastener such as a bolt 56 that retains the pivot-arm.

The pulley 12 is rotatable mounted to the pivot-arm 40 such as by means of a ball bearing 58 on a stub shaft 60 formed of the pivot-arm. The bearing is retained on the stub shaft such as by means of a bolt 62.

Ears 64, 66 with bolt receiving holes 68, 70 may be used a means for mounting the tensioner to an engine (not shown) as part of the belt drive system.

A second cylindrical member 72 that is off-set from the pivot-arm and coaxial with the first cylindrical member 46 provides a housing for the torsional spring and the damping means 44. The second cylindrical member extends into a cylindrical depression 74 formed in the housing in a somewhat "telescopic" fashion. A dust seal 76 maintains a clean environment for the spring and damping means 44. The second cylindrical member also forms part of the damping means.

Referring more particularly to FIGS. 2, 3, 4, 7 and 9, the damping means 44 is a mechanism that includes an extension 78 of spring end 42, a brake shoe 80 with an outside arcuate friction surface 82 that engages a complementary inside arcuate surface 84 of the second cylindrical member 72. The brake shoe has oppositely facing, inside ramp surfaces with a space intercept at an apex of an angle A. Optionally, the brake shoe has a lining 90 that defines the friction surface 82 and is attached to the shoe such as by teeth 92 that snap into slots 94 formed of the brake shoe.

The end of the spring 42 that interconnects through the base 34 bends around a protuberance 96 (shown as a post) formed of the base or attached to the base. The extension 78 of the spring end has a surface 98 that slidably engages inside ramp surface 86 formed of the brake shoe. The base includes a protuberance 100 (shown as a post) formed of the base or attached to the base and which has a complementary ramp surface 102 that slidably engages the ramp surface 88 formed of the brake shoe.

The spring 36 under torsion applies a spring force SF substantially normal to inside ramp surface 86 pressing inside ramp surface 88 of the shoe against the complementary ramp arcuate surface 102 of the base and pressing the lining against the complementary inside surface 84 of the second cylindrical member 72 causing a reactionary force RF to be imparted to the shoe. The spring force SF applied to the inside ramp surface 86 in combination with the reactive force RF at the inside ramp surface 88 generates a normal force NF that is equal and opposite a force 104 carried at the complementary inside arcuate surface 84 of the second cylindrical member 72. The so generated normal force NF is generally in the same direction (generally parallel) to the belt force BF. The magnitude of the spring force can be varied by changing the angle A between the inside ramp surfaces and the direction of the spring force SF. The greater the angle, the greater the normal force. The angle A between inside ramp surfaces may be from about 60° to 140°, but more preferably, angle A is from about 90° to 120°.

Figure 7:
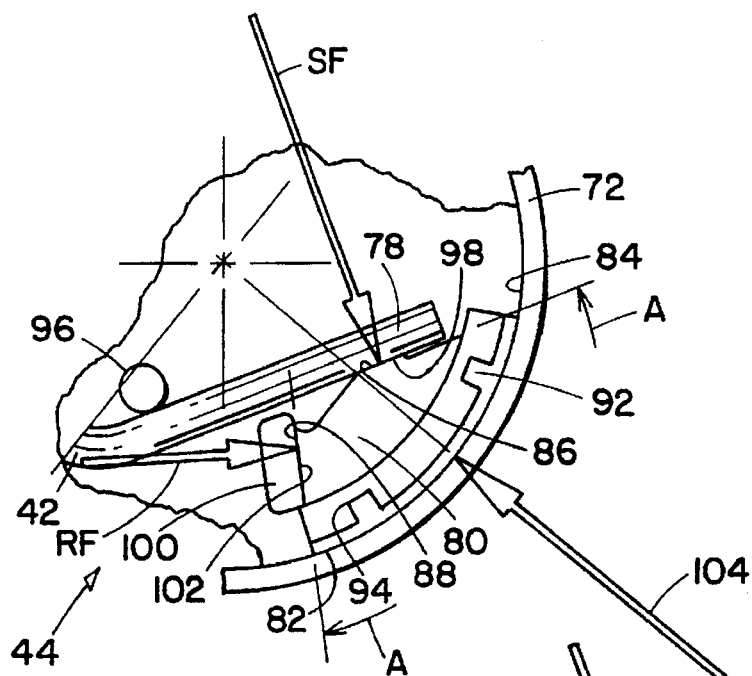
FIG. 7 is an enlarged broken away view generally along the lines 7—7 of FIG. 3 and showing a damping mechanism of the invention.
Figure 8:
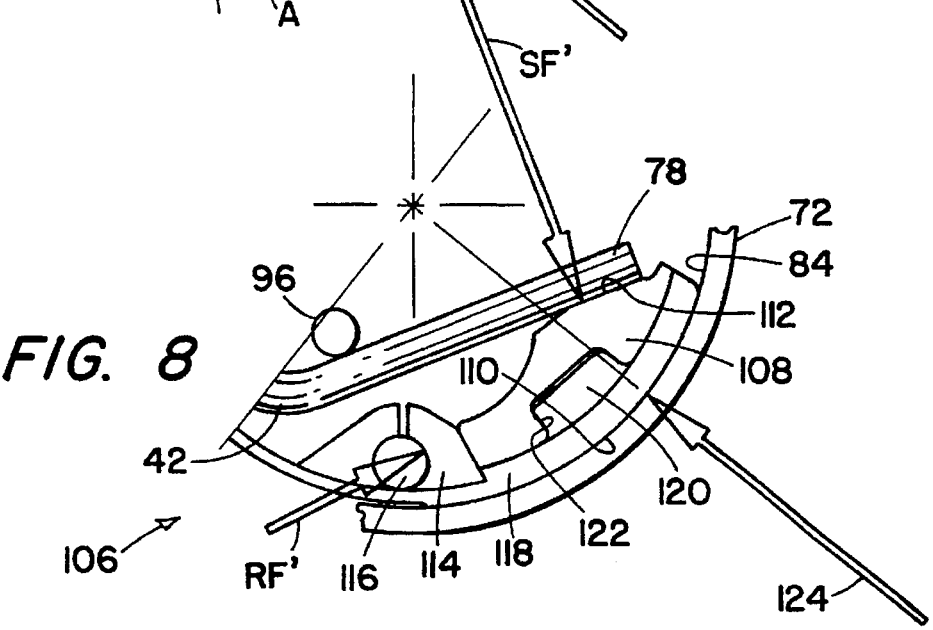
FIG. 8 is a view similar to that of FIG. 7 but showing an alternate embodiment of a damping mechanism.
Figure 9:
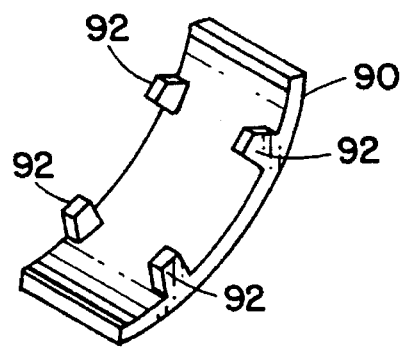
FIG. 9 is an isometric view showing a lining for the brake shoe of FIG. 7.

Another embodiment of a damping mechanism similar to that of FIG. 7 is illustrated in FIG. 8. The damping mechanism 106 includes the extension 78 of spring end 42 and the brake shoe 108 with an outside arcuate friction surface 110 that engages the complementary inside surface 84 of the second cylindrical member 72. The brake shoe has an inside ramp surface 112 that slideably engages extension 78 of the spring. Opposite the ramp surface is a journal 114 that snaps over a pivot post 116 attached to or formed of the base. Optionally, the brake shoe has a lining 118 that defines the friction surface 110 and is attached to the brake shoe such as by a tooth 120 that snaps into a slot 122 formed in the brake shoe.

The end of the spring 42 that interconnects through the base 34 bends around a protuberance 96 (shown as a post) formed of the base or attached to the base. The extension 78 of the spring end slidably engages the inside ramp surface 112 formed of the brake shoe.

The spring 36 under torsion applies a spring force SF' substantially normal to the inside ramp surface 112 pivoting the shoe with its lining against the complementary inside surface 84 of the second cylindrical member 72. The spring force SF' applied to the inside ramp surface 112 in combination with the reactive force RF' at the pivot post 116 generates a normal force that is equal and opposite a force 124 carried at the complementary inside surface 84 of the second cylindrical member. The so generated normal force is generally in the same direction (generally parallel) to the force BF as illustrated in FIG. 2.

The magnitude, direction, and location of the belt force and normal force of a tensioner is used to size the bearing surface of a bushing disposed on the pivot for an average pressure contact so that each bearing surface radially wears at substantially the same rate. Referring to FIG. 3, the belt force BF being off-set from the cylindrical member 46 operates to apply a clockwise moment to the cylindrical member 46 in the cross-section shown in FIG. 4. The normal force NF operating against the second cylindrical member operates at a moment arm 126 to move the cylindrical member in a counter clockwise direction in the cross-section of FIG. 4. The forces so introduced to the cylindrical member are carried by bushings 48, 50 which each has a bearing surface that supports the cylindrical surface and may be represented by a bearing force component BC1, BC2. The bearing surfaces are spaced a distance D apart. Bearing force component BC1 operates at a moment arm 128 relative to the belt force BF and bearing surface component BC2 operates at a moment arm 130 relative to belt force BF.

Figure 5A:
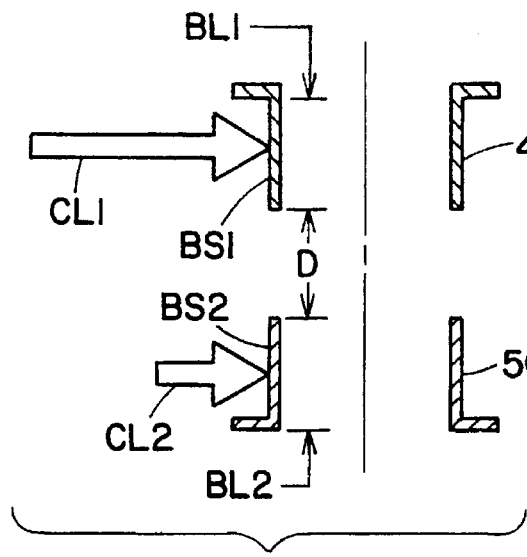
FIG. 5A is a schematic view in cross-section of the bushings of FIG. 4 and schematically showing component forces transferred to the bushings when the pivot-arm is moved in the clockwise direction.

Referring to FIG. 5A, each bushing 48, 50 has a bearing surface BS1, BS2 that supports a load CL1, CL2, as the pivot-arm is rotated in a clockwise direction. As known in the art, a damping mechanism generates a force which adds to the loads carried by the bearings when the pivot-arm is moved in one direction and subtracts to the loads carried by the bearings when the pivot-arm is moved in a clockwise direction. As illustrated in FIG. 5A, the load CL1 introduced to the bearing surface BS1 in the clockwise direction is greater than the load CL2 introduced into the bearing surface BS2 as the pivot-arm is moved in a clockwise direction.

Figure 5B:
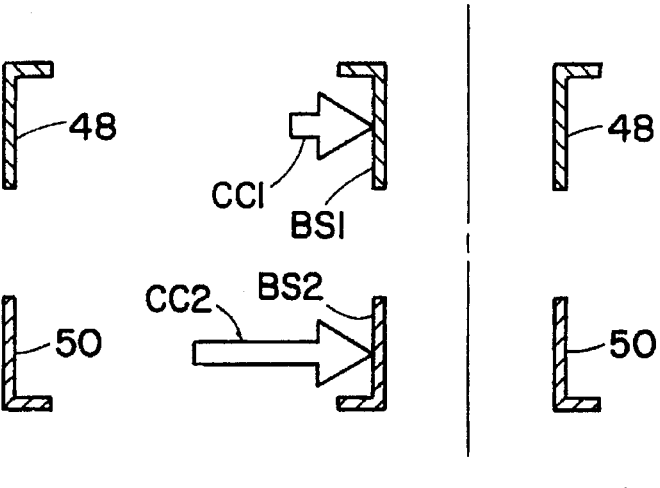
FIG. 5B is a view similar to 5A but showing the component forces when the pivot-arm moves in the counter clockwise direction.

Referring to FIG. 5B, the loads to the bearing surface substantially change when the pivot-arm is moved in the opposite or counter clockwise direction. As illustrated, the load CC1 that is introduced to bearing surface BS1 is smaller than the load CC2 introduced to bearing surface BS2 when the pivot-arm is moved in a counter clockwise direction.

Figure 5C:
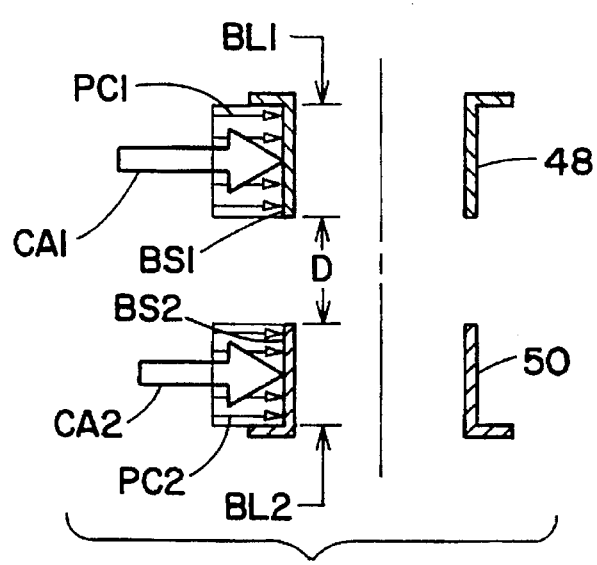
FIG. 5C is a composite view showing how the component forces of FIG. 5A and 5B may be averaged to effect an average pressure contact at a bearing surface of the bushing.

The loads CL1 and CC1 may be averaged to determine an average load that must be carried by bearing surface BS1. Similarly, the load CL2 and CC2 may be averaged to determine the loads that must be carried by bearing surface BS2. It is probable that the so averaged loads are unequal as illustrated in FIG. 5C. The average load CA1 (equal and opposite BC1) is larger than the average load CA2 (equal and opposite BC2). In accordance with the invention, bearing surface BS1 and BS2 have an axial length BL1, BL2 that size each bearing surface for an average pressure contact PB1, PC2 such that each bearing surface radially wears at substantially the same rate. As illustrated in FIG. 5C, bushing 48 has a longer axial length BL1 than does bushing 50 having axial length BL2 so that the pressure contact PC1 substantially equals PC2. Of course, if the bushings were made of different materials to have different wear rates, the length of the bushings can be sized for a pressure contact that yields substantially the same radial wear rate.

Figure 6:
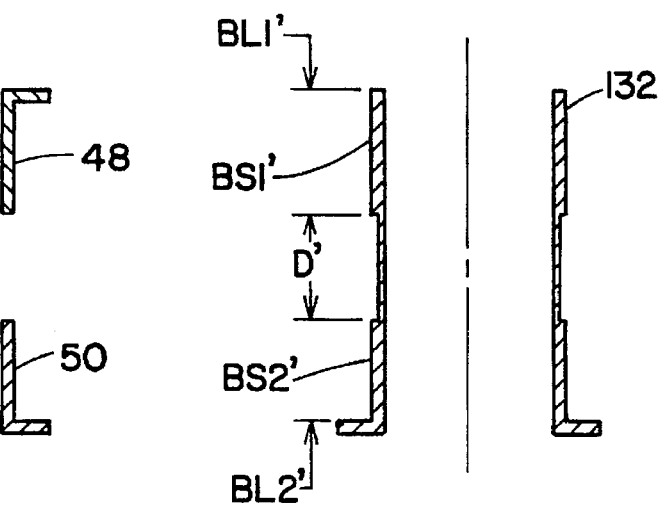
FIG. 6 is an alternate embodiment of a bushing having two spaced-apart bearing surfaces for receiving an average pressure contact as illustrated in FIG. 5C.

Referring to FIG. 6, a single bushing 132 may be used which has bearing surface BS1' spaced a distance D' from bearing surface BS2'. The length BL1' of bearing surface BS1' is greater than the length BL2' of bearing surface BS2' so that an average pressure contact (as illustrated in FIG. 5C) is substantially the same for each bearing surface.

A tensioner of the invention was constructed with a 76.2 mm diameter pulley, a 100.8 in-lbs torsional spring and with the following characteristics:

| | |
|---|---|
| BF Average | 108 lbs. |
| NF Average | 156 lbs. |
| SF Average | 123 lbs. |
| RF Average | 69 lbs. |
| 126 | 54.5 mm |
| 128 | 23.3 mm |
| 130 | 42.5 mm |
| D | 9.7 mm |
| CL1 | 216 lbs. |
| CL2 | 102 lbs. |
| CC1 | 77 lbs. |
| CC2 | 164 lbs. |
| CA1 | 146.5 lbs. |
| CA2 | 133 lbs. |
| BL1 | 10 mm |
| BL2 | 9 mm |
| PC1 | 636 psi |
| PC2 | 640 psi |

Referring to the above, the bearing length was sized in such a manner that there was substantially equal pressure contact (636 and 640 psi) for bushing 48 and 50. After the tensioner was constructed, the pulley misalignment relative to the pivot-pin was plus/minus 0.15°. The tensioner was tested by cycling its pivot-arm for 30×10$^6$ cycles under load to determine pulley alignment over an expected cycle life of the tensioner. The bearing surfaces BS1 and BS2 wore at substantially the same rate to yield a pulley alignment of plus/minus 0.30°. Before the test, the bushings had a radial thickness of 0.8 mm. After the test, the radial thickness of each bushing at the bearing surface carrying the load was 0.65 mm and 0.65 mm.

What is claimed is:

1. A tensioner for tensioning a power transmission belt and of the type with a base; a pivot-arm attached to an off-set cylindrical member that supports the pivot-arm and rotates about a pivot secured with the base; at least one sleeve-type bushing on the pivot and with a bearing surface that supports the cylindrical member; a pulley attached to the pivot-arm for engaging the belt and receiving a belt load; a torsional spring with one end connected to the pivot-arm and another end interconnecting through the base and generating a spring force operative with a damping means that generates a normal force component acting in generally the same direction as a belt force component transmitted by the pivot-arm to the cylindrical member (hereinafter hub load) whereby the hub load and normal force component are carried by the bearing surface and wherein the improvement comprises:

two axially spaced-apart bearing surfaces that each have an axial length that size each bearing surface for an average pressure contact in response to the hub load and normal force component such that each bearing surface radially wears at substantially the same rate.

2. The tensioner as claimed in claim 1 wherein the bushing is a single bushing having two spaced-apart bearing surfaces of unequal axial length.

3. The tensioner as claimed in claim 1 including two bushings of different materials and having unequal wear rates.

4. The tensioner as claimed in claim 1 including two bushings of the same material and having unequal axial lengths.

5. The tensioner as claimed in claim 4 wherein the bearing surfaces have substantially equal pressure contact in response to the hub load and normal force component.

6. The tensioner as claimed in claim 1 wherein the normal force generated by the damping means is greater than the spring force.

7. The tensioner as claimed in claim 6 wherein the damping means comprises:

a brake shoe with 1) an outer, arcuate friction surface that engages a complimentary inside surface of the cylindrical member, and 2) first and second oppositely facing, inside ramp surfaces with a space intercept at an apex of an angle defined between the two ramp surfaces;

the base having a complementary ramp surface that slidably engages the first ramp surface of the brake shoe;

the spring end interconnecting through the base having an extension that slidably engages and applies the generated spring force to the second ramp surface of the brake shoe; and whereby the spring force applied to the second ramp surface in combination with a reactive force at the first ramp surface of the brake shoe generates the normal force.

8. The tensioner as claimed in claim 7 wherein the angle between the two ramp surfaces is from about 60° to 140°.

9. The tensioner as claimed in claim 7 wherein the angle between the two ramp surfaces is from about 90° to 120°.

10. The tensioner as claimed in claim 7 wherein the brake shoe includes an attached lining that defines the arcuate friction surface.

11. The tensioner as claimed in claim 7 wherein the damping means comprises:

a brake shoe with an outer, arcuate friction surface that 1) engages a complementary inside surface of the cylindrical member, and 2) an inside ramp surface and pivot;

the base having a pivot post that attaches through a journal of the brake shoe; and the spring end interconnection through the base having an extension that engages and applies the generated spring force to the inside ramp surface to rotate the brake shoe about the pivot to generate normal force at the friction surface.

12. A power transmission system with a belt entrained around a plurality of pulleys and including a tensioner for tensioning the power transmission belt and the tensioner of the type with a base; a pivot-arm attached to an off-set cylindrical member that supports the pivot-arm and rotates about a pivot secured with the base; at least one sleeve-type bushing on the pivot and with a bearing surface that supports the cylindrical member; a tensioning pulley attached to the pivot-arm for engaging the belt and receiving a belt load; a torsional spring with one end connected to the pivot-arm and another end interconnecting through the base and generating a spring force operative with a damping means that generates a normal force component acting in generally the same direction as a belt force component transmitted by the pivot-arm to the cylindrical member (hereinafter hub load) whereby the hub load and normal force component are carried by the bearing surface and wherein the improvement comprises:

two axially spaced-apart bearing surfaces that each have an axial length that size each bearing surface for an average pressure contact in response to the hub load and normal force component such that each bearing surface radially wears at substantially the same rate.

13. The tensioner as claimed in claim 12 wherein the bushing is a single bushing having two spaced-apart bearing surfaces of unequal axial length.

14. The tensioner as claimed in claim 12 including two bushings of different materials and having unequal wear rates.

15. The tensioner as claimed in claim 12 including two bushings of the same material and having unequal axial lengths.

16. The tensioner as claimed in claim 15 wherein the bearing surfaces have substantially equal pressure contact in response to the hub load and normal force component.

17. The tensioner as claimed in claim 12 wherein the normal force generated by the damping means is greater than the spring force.

18. The tensioner as claimed in claim 12 wherein the damping means comprises:

a brake shoe with 1) an outer, arcuate friction surface that engages a complimentary inside surface of the cylindrical member, and 2) first and second oppositely facing, inside ramp surfaces with a space intercept at an apex of an angle defined between the two ramp surfaces;

the base having a complementary ramp surface that slidably engages the first ramp surface of the brake shoe;

the spring end interconnecting through the base having an extension that slidably engages and applies the generated spring force to the second ramp surface of the brake shoe; and whereby the spring force applied to the second ramp surface in combination with a reactive force at the first ramp surface of the brake shoe generates the normal force.

* * * * *